Figure 1:
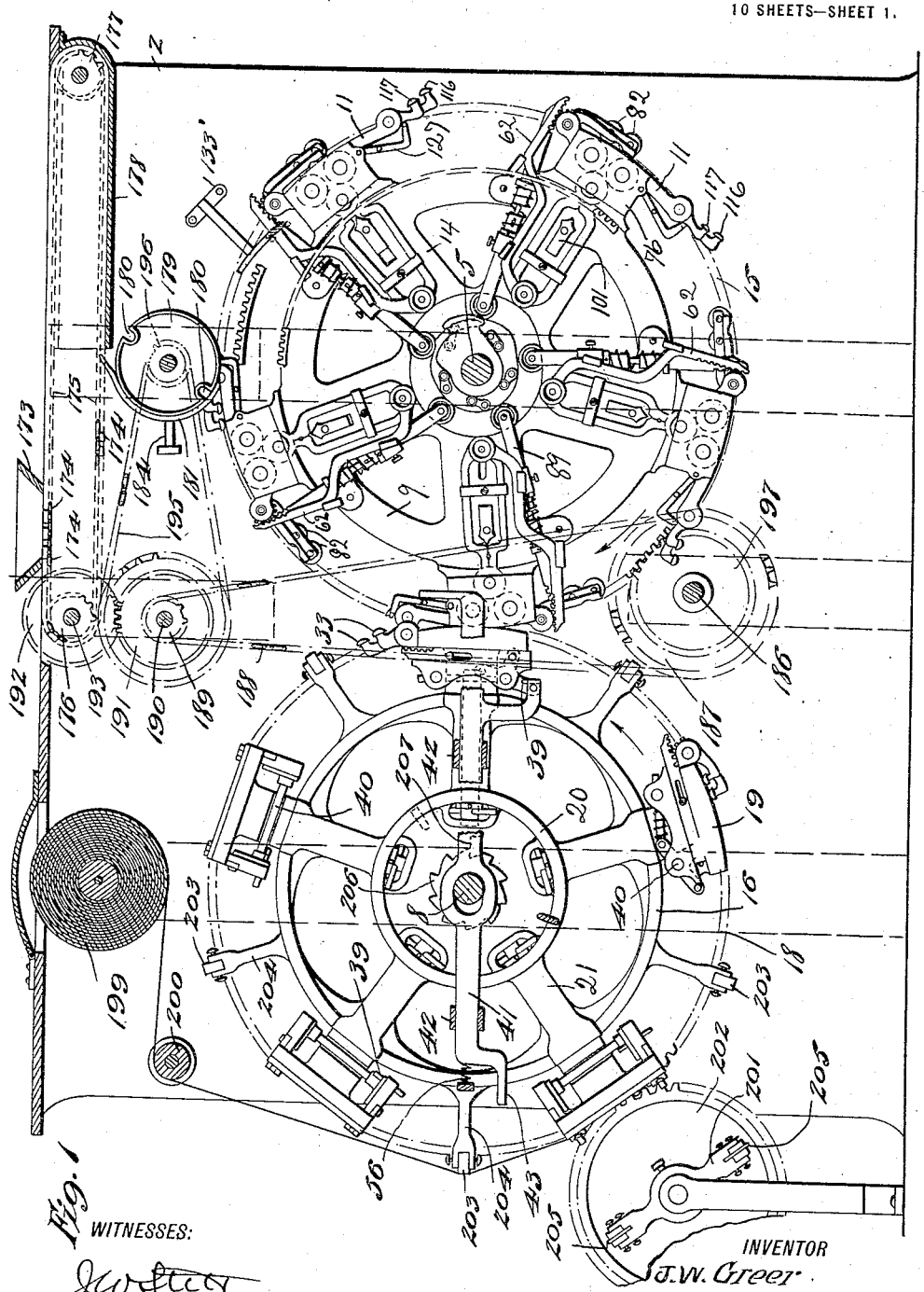

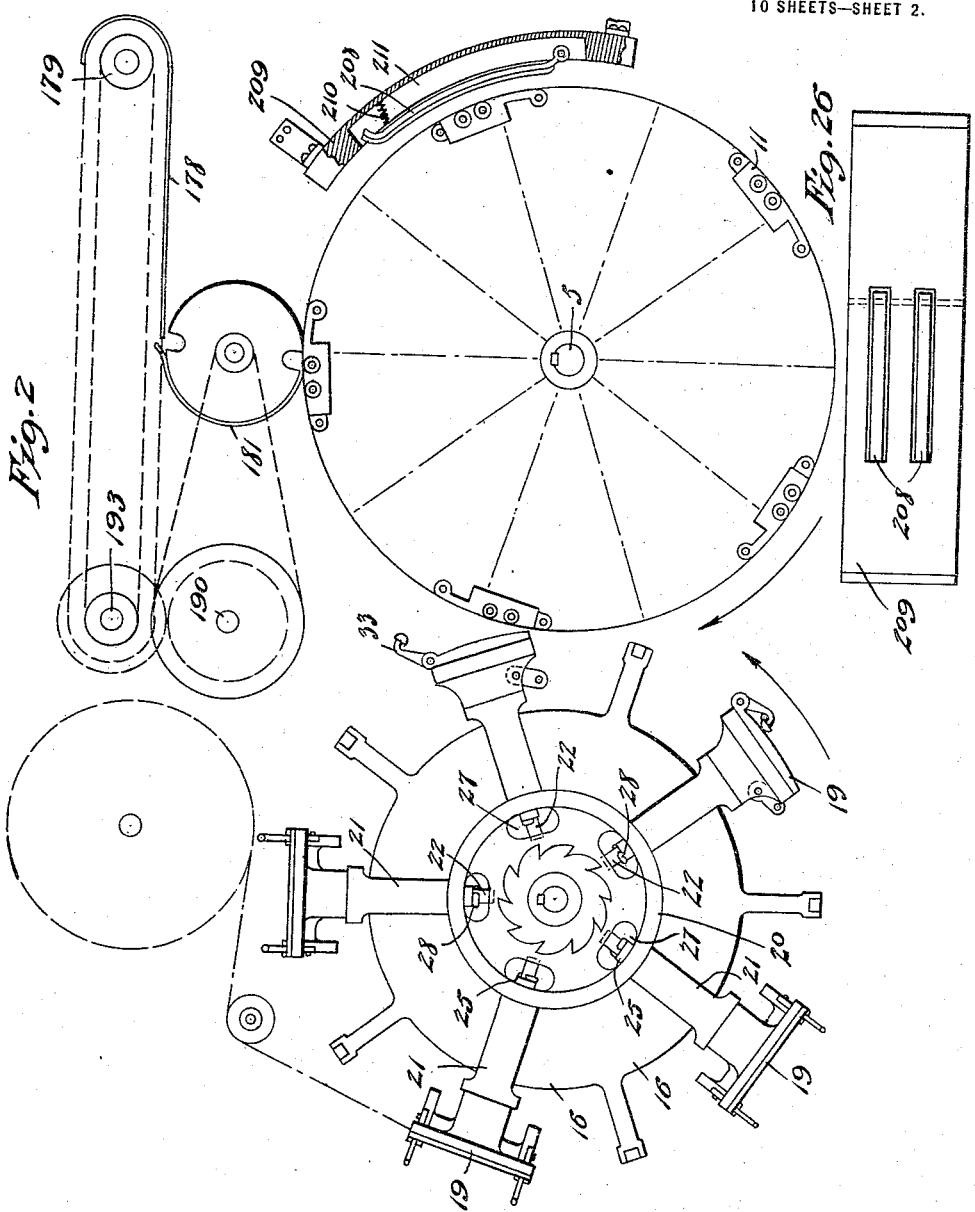

J. W. GREER.
CANDY WRAPPING MACHINE.
APPLICATION FILED MAR. 23, 1915.
1,218,854.
Patented Mar. 13, 1917.
10 SHEETS—SHEET 3.
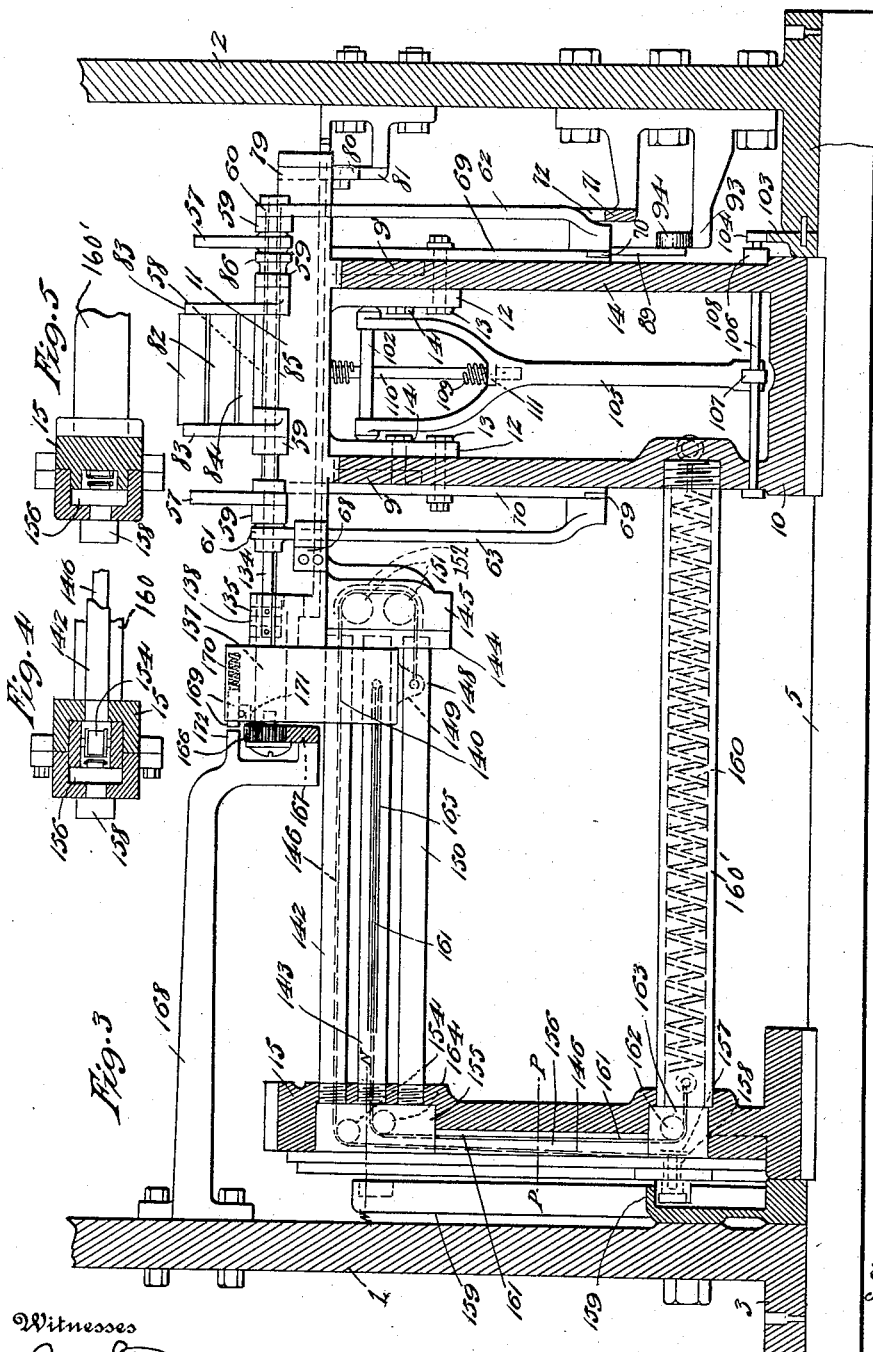
Witnesses
Jr Steel
W. P. Tinsley.
Inventor
J. W. Greer
By A. L. Jackson
Attorney

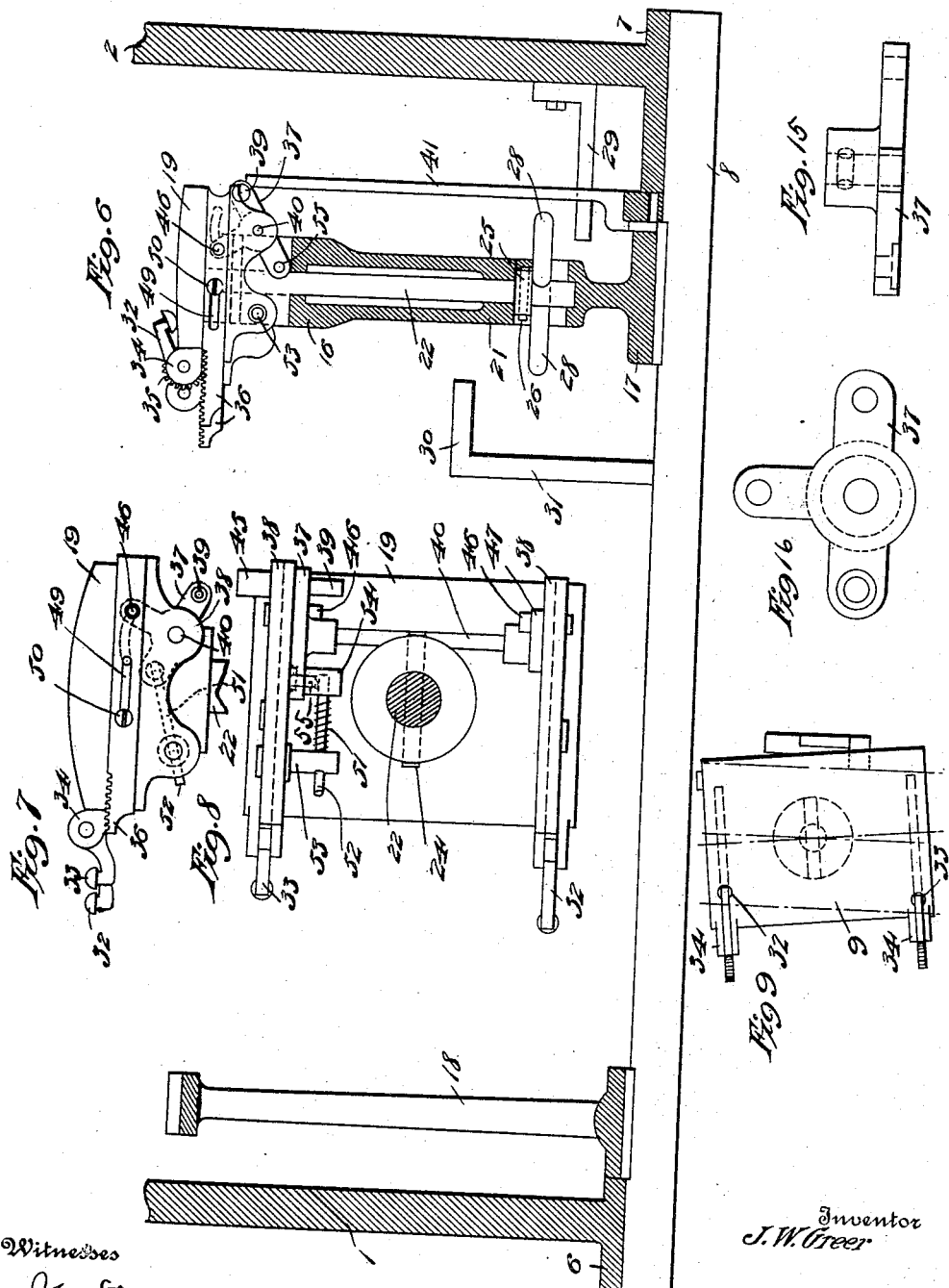

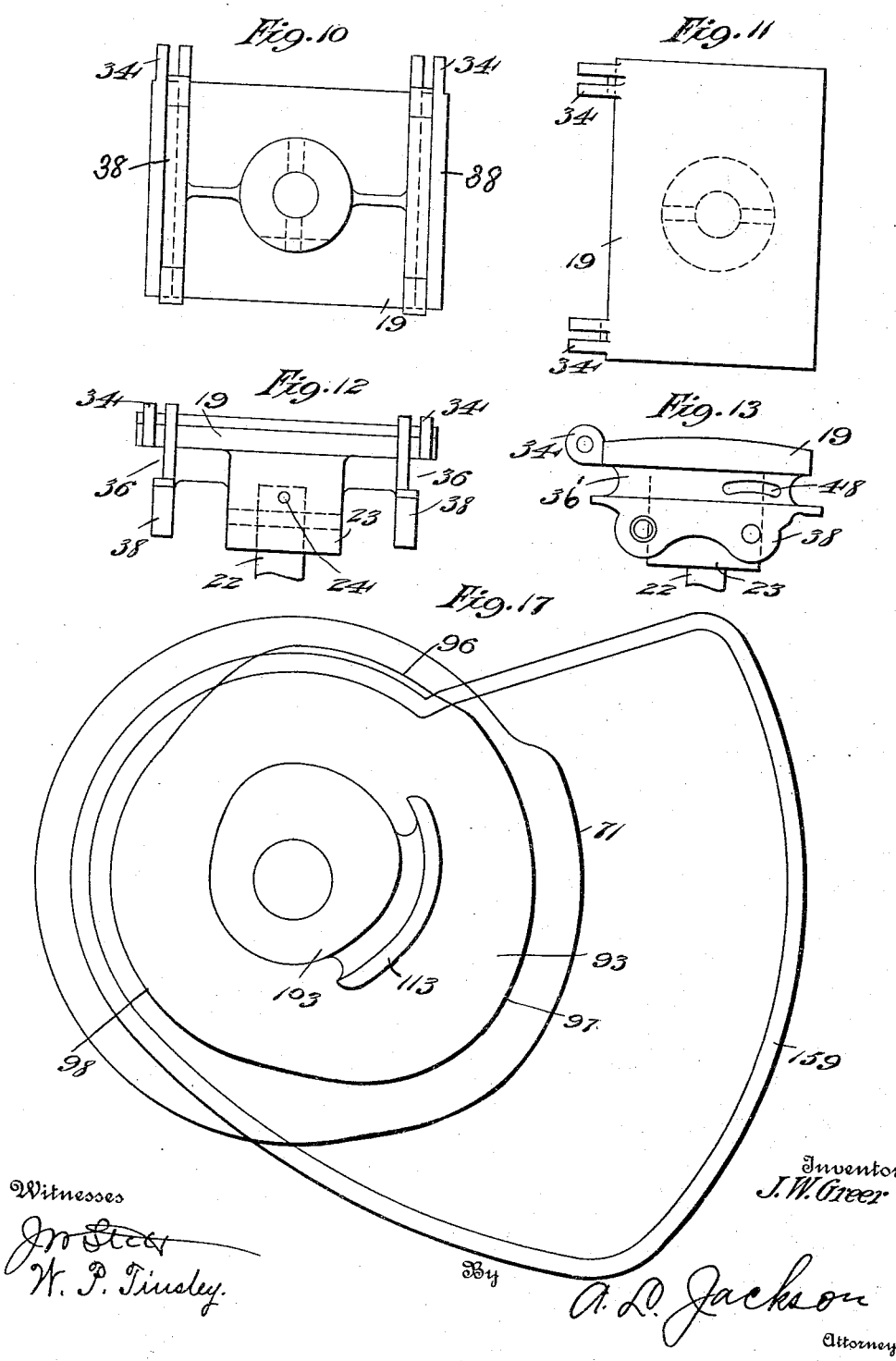

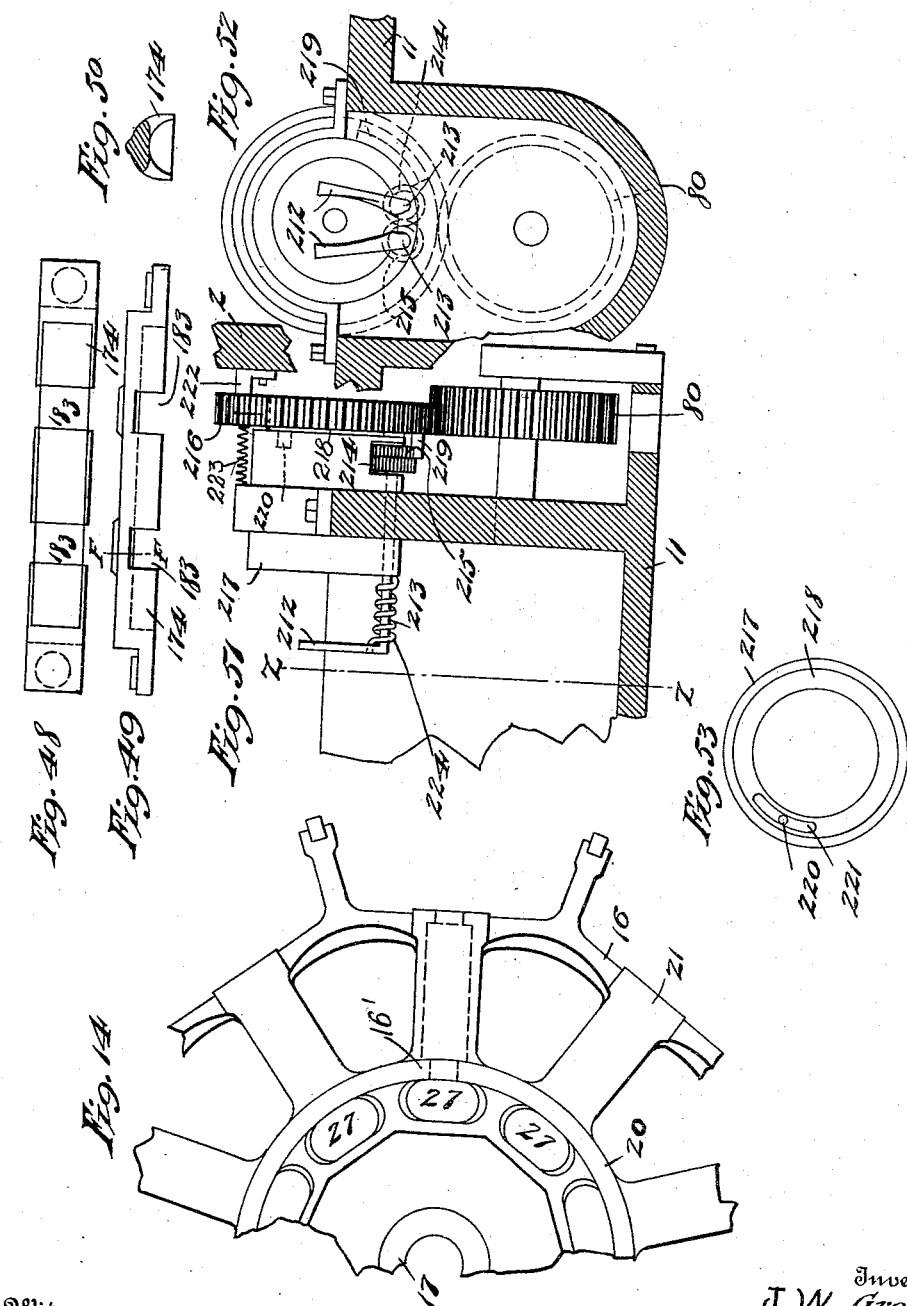

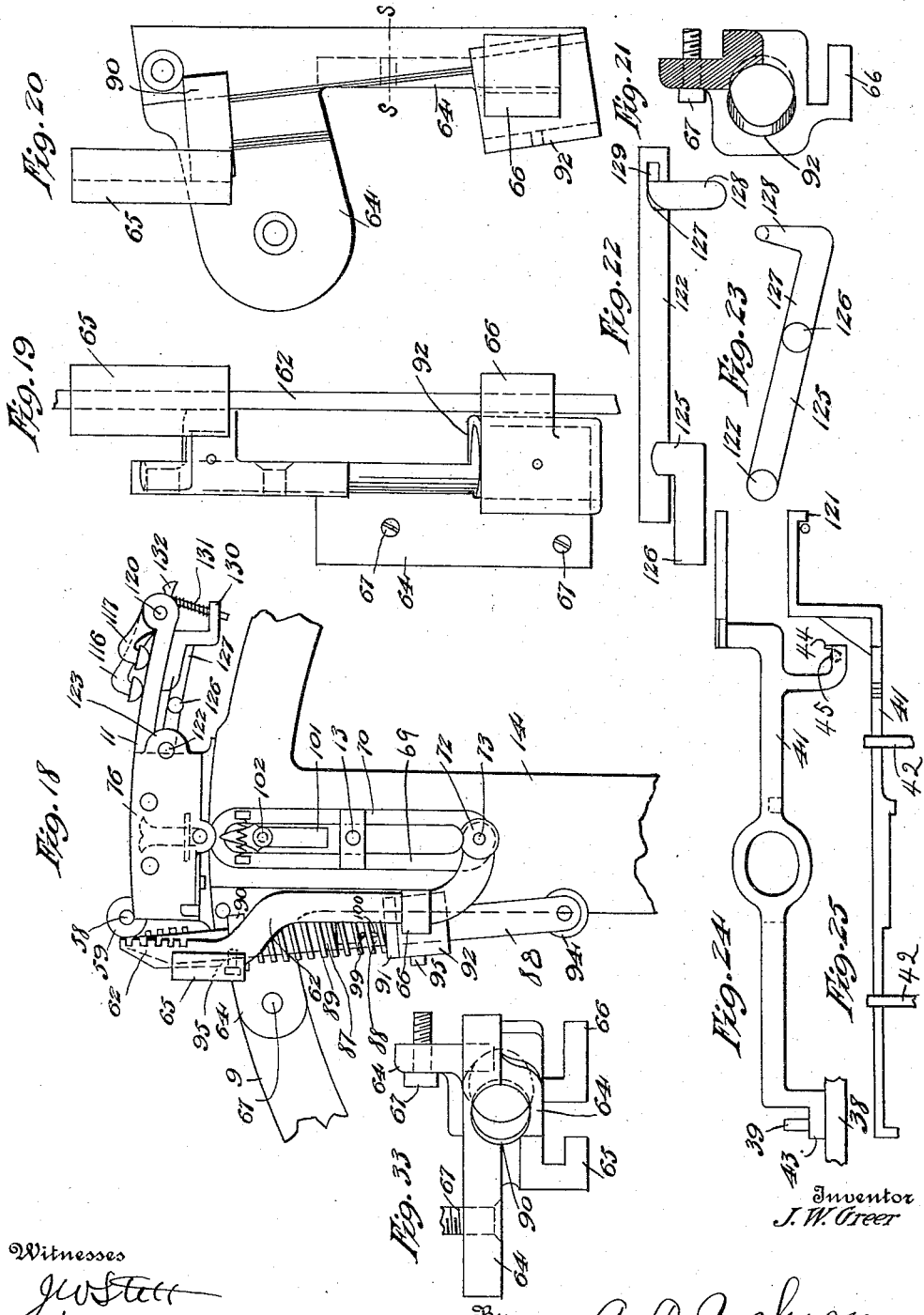

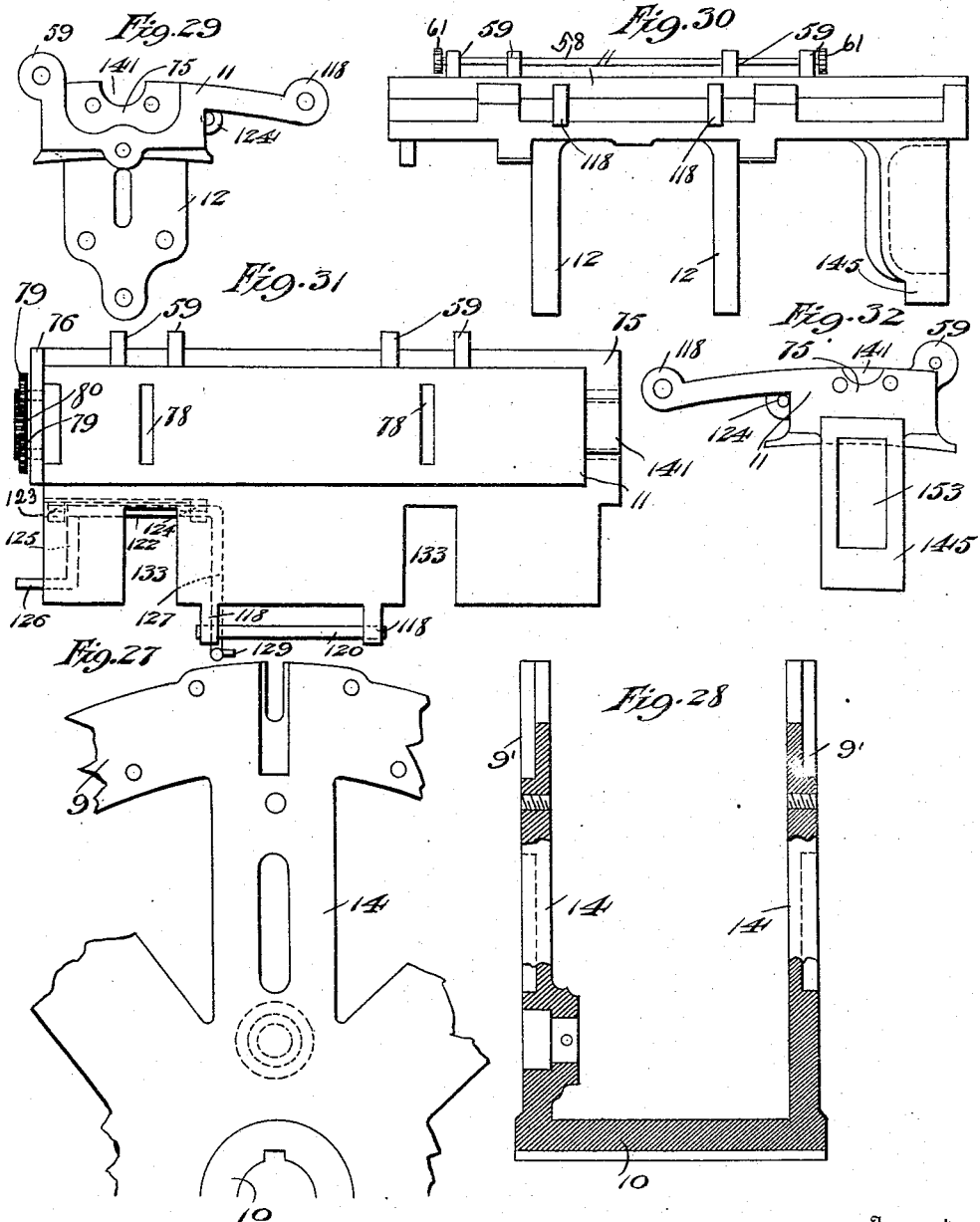

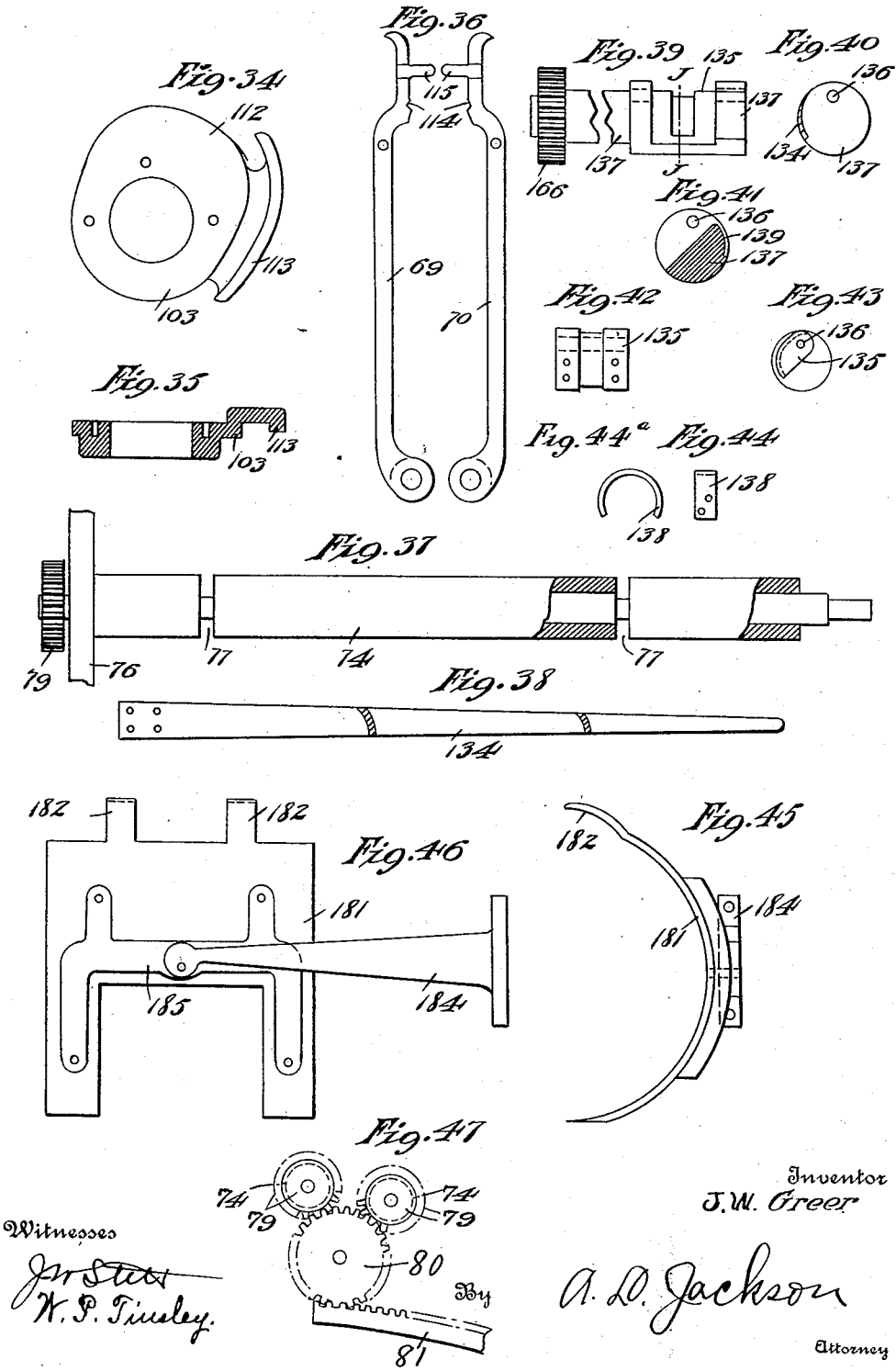

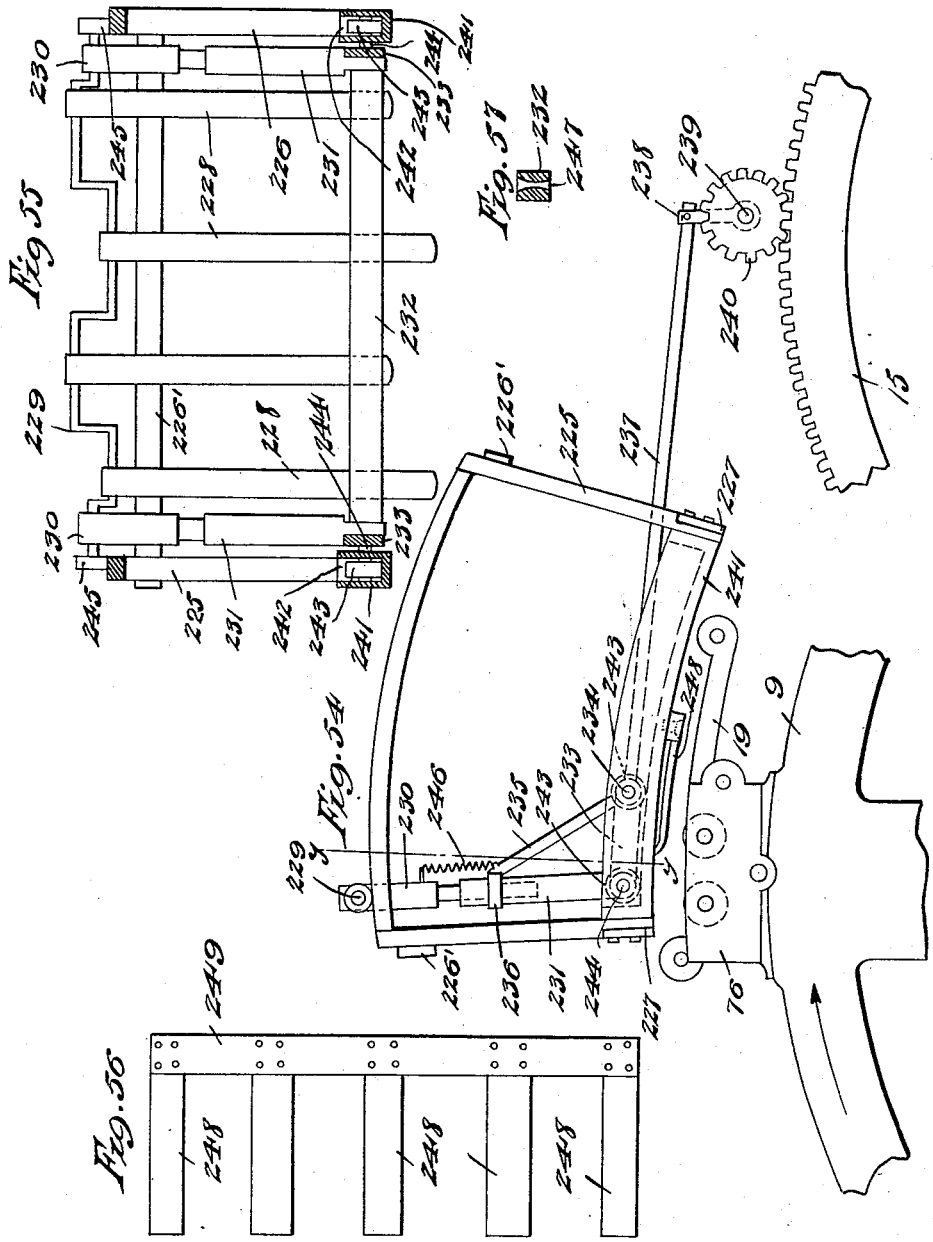

UNITED STATES PATENT OFFICE.

JESSE W. GREER, OF FORT WORTH, TEXAS, ASSIGNOR, BY MESNE ASSIGNMENTS, TO MASSACHUSETTS MACHINERY COMPANY, A CORPORATION OF MASSACHUSETTS.

CANDY-WRAPPING MACHINE.

1,218,854. Specification of Letters Patent. Patented Mar. 13, 1917.

Application filed March 23, 1915. Serial No. 16,365.

*To all whom it may concern:*

Be it known that I, JESSE W. GREER, a citizen of the United States, residing at Fort Worth, in the county of Tarrant and State of Texas, have invented certain new and useful Improvements in Candy-Wrapping Machines, of which the following is a specification.

My invention relates to a candy wrapping machine, and more particularly to a machine for wrapping stick candy; and the object is to provide a machine which will carry paper in suitable sizes for sticks of candy, receive the candy, stick by stick, and wrap the paper on the candy and twist the ends of the paper at the ends of each stick of candy all automatically, to provide means for feeding the paper to the candy wrapping mechanism automatically and cut the paper in suitable lengths and turn it transversely to the grain of the paper; and to provide the machine with means for feeding the candy to the candy wrapping mechanism and deposit it stick by stick on the paper carried by the candy wrapping mechanism. Another object is to provide a machine which will be simple in mechanism and simple in operation and which will wrap the candy in an economical manner to avoid expense, and to provide a machine which will wrap candy quickly so that large quantities of candy may be furnished in short times. Other objects and advantages will be fully explained in the following description and the invention will be more particularly pointed out in the claims.

Reference is had to the accompanying drawings which form a part of this application.

Figure 1 is a side elevation of the machine with the front part of the frame, or rather that part of the frame which would be in front of the side elevation of the operating mechanism. Fig. 2 is a side elevation of the paper cutting and feeding wheel and of the wrapping wheel with a diagrammatic view of the paper reel and the candy feeding mechanism. Fig. 3 is a vertical section of one-half of the candy-wrapping wheel and a broken section of the frame. Fig. 4 is a horizontal section, taken on the line N—N of Fig. 3. Fig. 5 is a horizontal section, taken on the line P—P of Fig. 3. Fig. 6 is a vertical section of the paper cutting and feeding wheel, showing a half section of the wheel and a broken section of the frame and a half section of the spur gear for driving said wheel. Fig. 7 is a side elevation of one of the paper carrying and turning and feeding tables. Fig. 8 is a bottom plan view of the same. Fig. 9 is a top plan view of the same. Fig. 10 is a bottom plan view of the paper carrying table with the operating mechanism omitted. Fig. 11 is a top plan view of the same with the operating mechanism omitted. Fig. 12 is a similar view of the end of the table. Fig. 13 is a similar view of the side of the table. Fig. 14 is a detail view of the paper carrying and cutting wheel, being a broken view. Fig. 15 is a plan view of the bell-crank tripping lever for actuating the fingers on the paper carrying table. Fig. 16 is a side elevation of the same. Fig. 17 is a diagrammatic view, illustrating the cams on the machine frame for actuating several elements of the paper wrapping and twisting mechanism. Fig. 18 is a side elevation of one of the wrapping tables, showing the same mounted on the paper wrapping wheel spoke. Fig. 19 is a rear elevation, on a larger scale, of the brackets for supporting and guiding the finger actuating mechanism for the wrapping table. Fig. 20 is a side elevation of the same. Fig. 21 is a section, taken on the line S—S of Fig. 20. Fig. 22 is a side elevation, full size, of a rocker-shaft used in actuating the paper holding fingers of the wrapping table. Fig. 23 is an end view of the same. Fig. 24 is a side elevation of a slide bar used in shifting the paper from the paper carrying and cutting wheel to the wrapping wheel. Fig. 25 is a plan view of the same, these two views being on a very much reduced scale,—one-fourth actual size. Fig. 26 is a detail view of a wrapping wheel attachment. Fig. 27 is a detail view of the wheel, being a broken view of the casting. Fig. 28 is a broken sectional view of the same. Fig. 29 is a side elevation of a wrapping table casting. Fig. 30 is an end view of the same. Fig. 31 is a plan view of the same. Fig. 32 is the opposite of the same from that shown in Fig. 29. Fig. 33 is a plan view of the bracket shown in Fig. 20. Fig. 34 is a side elevation of the cam on the frame for actuating the wedges of the end twisting mechanism. Fig. 35 is a horizontal section of the same. Fig. 36 is a front view of the fingers which twist the ends of the paper on the candy. Fig. 37 is a view of one of the candy wrapping rollers, showing the annular grooves in the rollers which serve as guides for the paper twisting fingers. Fig. 38 is a side elevation with sections of the paper starter. Fig. 39 is a side elevation of the carrier for the paper starter. Fig. 40 is an end view of the same. Fig. 41 is a section, taken on the line J—J of Fig. 39. Fig. 42 is a side elevation of the block which is inserted in the carrier shown in Fig. 39. Fig. 43 is an end elevation of the same. Fig. 44 is a view of the spring which coöperates with said block to permit a limited rocking motion of the starter. Fig. 44ª is an edge view of the same. Fig. 45 is a side elevation of the candy guide used in the candy-feeding mechanism. Fig. 46 is a rear elevation of the same. Fig. 47 is a detail view illustrating the gearing for operating the candy wrapping rollers. Fig. 48 is a plan view of one of the candy-carrying trays. Fig. 49 is a side elevation of the same inverted into the position for feeding the stick of candy to the candy feeding wheel. Fig. 50 is vertical section of the same, taken on the line F—F of Fig. 49. Fig. 51 is a detail view of a variation in the candy twisting mechanism. Fig. 52 is a section, taken on the line z—z of Fig. 51. Fig. 53 is a face view of the carrier shown in Figs. 51 and 52. Fig. 54 illustrates a variation in the paper starting mechanism. Fig. 55 is a vertical cross-section, taken on the line y—y of Fig. 54, parts being omitted. Fig. 56 is a plan view of paper pressing fingers carried on the bottom of the starting mechanism. Fig. 57 is a cross-section of the bar 232.

Similar characters of reference are used to indicate the same parts throughout the several views.

The machine herein set forth has a frame with side bearing members 1 and 2 provided with bearings 3 and 4 for a shaft 5 and bearings 6 and 7 for a shaft 8. The machine is provided with a revolving wheel 9 which has a hub 10 engaging shaft 5. The wheel 9 carries a series of candy wrapping tables 11 attached thereto. Five of such tables are shown. It is apparent that any suitable number of such tables may be used and in practice or service ten tables will be used. The tables 11 are attached to the wheel 9 by ears or flanges 12 which project radially inward and secured by bolts 13. The wheel 9 consists of a single hub 10 and of two rims 9'—9' connected to the hub 10 by spokes 14. The wheel 9 is driven by a spur gear wheel 15 which is rigid with shaft 5.

Means are provided for feeding paper in suitable lengths to each wrapping table, one piece of paper being fed to each table as the table passes a fixed point. A paper feeding wheel 16 is rigid with the shaft 8, having a hub 17 engaging said shaft. The shaft 8 is driven by a spur gear 18. The wheel 16 carries a plurality of paper receiving and carrying and feeding tables 19. This wheel has an outer hub or rim 20 and hollow spokes 21 integral therewith and which spokes are also integral with the disk portion 16' of the wheel. The tables 19 are mounted on spindles or shafts 22 which are rotatable in the spokes 21. The tables 19 are secured to the spindles 22 by means of sockets 23 integral therewith and by pins 24. The spindles 22 are held in the rim 20 by collars 25 and pins 26, the wheel having cut-outs 27 for the operation of the collars and pins. A single pin 28 is mounted in each spindle 22 and projects on each side thereof and forms lugs for the operation of the spindles, these lugs turning in the cut-outs 27 of the wheel. Means are provided for turning these lugs 28 at fixed points. The wheels 9 and 16 turn toward each other from the lower part of the machine. The tables 19 carry the wrapping paper and in order that the paper may not be torn during the twisting, the paper must be turned at right angles to the travel of the feeder member so that the twisting will be across the grain instead of with the grain. This turning is done just prior to the time the paper is to be fed from a table 19 to a wrapping table 11. As the wheel 16 carries a table 19 toward the wheel 9 which is carrying the wrapping tables 11, the lug 28 for the table 19 strikes a trip 29 mounted on the frame 2 and this trip turns the table 19 at right angles to the position in which the table has been traveling. The table 19 is then in position to feed the sheet of paper to a wrapping table 11. The shaft 22 turns 45 degrees back and forth. After the sheet of paper has been fed from the table 19, the table must be turned 45 degrees backward by means of the shaft 22. Just before the table 19 reaches the position to receive another sheet of paper, a similar lug 30 to lug 29 engages the pin 28 on the other side of wheel 16 and turns the shaft 22 one quarter turn or 45 degrees backward. The lug 30 is carried by a bracket 31 which is attached to the machine frame and holds the lug 30 in the path of the pin 28.

Means are provided for clamping the sheets of paper on the tables 19. Fingers 32 and 33 are pivotally mounted on the table 19 by means of bearings 34 and racks 35 are formed on the bases of the fingers. Sliding racks 36 are mounted in channels 36' in the sides of the tables 19 and means are provided for actuating these racks. A bell-crank lever 37 is fulcrumed in a depending ear 38 which is integral with the table 19. This lever 37 has a pin or lug 39 and is rigid with a rocker shaft 40. A sliding bar 41 is mounted in guides 42 rigid with the machine frame and reciprocates in these guides. The bar 41 has a lug 43 integral therewith and this lug 43 engages the pin or lug 39 which is on the inside of the ears 38 to close the fingers 32 and 33 down on the paper, clamping the paper to the table 19. A cam 44 rigid with the machine frame strikes a lug 45 (which is rigid with the lug or pin 39 and with the lever 37) on the outside of the ears 38 or table 19 to open the fingers 32 and 33 at the same time the similar fingers on the wrapping table are closed. The racks 36 are moved by pins 46 which are carried by the lever 37 and the crank 47 on the other end of rocker-shaft 40. These pins 46 operate in slots 48 in the depending ears 38 of the table 19. The racks 36 have slots 49 and headed screws or bolts 50 are projected through the slots 49 and screwed into the table 19 to prevent displacement of the racks. A spring 51 is used to prevent the lever 37 from stopping on dead center. A small rod 52 moves freely through a rocking bolt 53 and is threaded into the thimble 54 which is loosely mounted on the pin or bolt 55 which is carried by an arm rigid with the bell crank lever 37. A spring 56 is attached to the machine frame and to the sliding bar 41 to restore this bar to normal position.

Means are provided for holding the sheets of paper on the wrapping tables 11. The sheets of wrapping paper are fed from the tables 19, one at a time, to the tables 11 of the wrapping wheel. Clamping fingers 57 are rigid with a shaft 58 and this shaft is journaled in the bearings 59. Pinions 60 and 61 are rigid with a shaft 58. These pinions engage racks 62 and 63 respectively for the purpose of operating the clamps 57. The rack 62 is guided in its radial movement by a bracket 64 which has guiding members 65 and 66. The bracket 64 is attached to the spoke 14 and the wheel 9 by cap screws 67. The rack 63 is guided in its vertical or radial movement by a bracket 68 which is attached to the casting of table 11. The rack 62 turns the pinion 60 which is rigid on inner shaft 58 and shaft 58 drives pinion 61 which actuates the rack 63. The racks 62 and 63 thus operate in unison and operate the paper holding clamps 57 and also the paper holding fingers 69 and 70 which are in pairs on each side of a wrapping table. The fingers 69 and 70 are moved radially outward to be opened to receive the ends of the paper after the paper has been rolled in tubular form on the candy, by mechanism hereinafter described. After the paper is caught in between the fingers 69 and 70, the clamps 57 prevent the paper from escaping from the fingers 69 and 70 while the paper is being twisted. The rack 62 is moved vertically by a cam 71. An antifriction roller 72 is provided on the pivot bolt 73 to prevent friction between the radially moving racks and the operating cam. While the candy is being twisted, it is supported on rubber faced rollers 74 which are journaled in a bearing 75 on one side of the table 11, and in a removable bearing plate 76 at the other side of the table. The rollers 74 have annular grooves 77 so that the fingers 69 and 70 will move upwardly and be held against lateral movement (relative to the table 11) by the walls formed by the grooves in the rollers. The wrapping table 11 is provided with slots 78 for the upward passage of the fingers 69 and 70. The rollers 74 are driven by spur gearing or gear wheels 79 rigid therewith and by the gear wheel 80 which is driven by a rack 81 which is rigid with the frame piece 2. The rack 81 is a segmental rack rigid with frame piece 2 and of sufficient length to revolve the gear wheel 80 a sufficient number of times to twist the paper on the ends of the sticks of candy.

Additional rollers are provided for coöperating with the rubber faced rollers 74 to tighten the paper on the candy and to hold the candy in place on the rollers 74. Rollers 82 are journaled and carried in a yoke composed of arms 83 and a bar 84 which is riveted to the arms 83 and spaces these arms fixedly apart. The yoke 83 is rigid on a hollow shaft 85 in which the shaft 58 turns. A pinion 86 is rigid with the hollow shaft 85 and this pinion is actuated by a two part rack 87—88 which parts are connected by a telescopic joint and spaced apart by a spiral spring 89. The spring 89 bears at the outer end against a shoulder 90 which is integral with bracket 64 and at the inner end bears against a set collar 91 fixed on the part 88 of the rack. The rack member 88 is guided in its vertical movement by a collar 92 which is integral with the bracket 64. The upper part 87 of the rack is guided by the collar 90 above described. The rack 87—88 is moved radially by a cam 93 which is rigid with frame piece 2. The rack member 88 is provided with an antifriction roller 94 which engages the cam 93. The rack 87—88 is prevented from twisting or turning out of operative positions by screws 95 which project into slots in the two members, having been screwed through parts of the collars 90 and 92. When the part 96 of cam 93 engages the roller 94 of rack member 88, the rollers 82 press lightly on the paper which is being wrapped on the candy and when the face 97 of cam 93 engages the roller 94, the rollers 82 press with full force on the paper. When the face 98 of cam 93 engages the roller 94, the arms 83 are swung back carrying rollers 82 out of operative position, the spring 89 causing or forcing the rack 87—88 radially inward and the roller 94 to engage the different faces of the cam 93. The two part rack 87—88 is yieldingly connected together by the telescopic connection and with the spring 89 with its bearing collars 90 and 91 to permit the rollers to engage candy of different sizes and shapes. The rack members 87 and 88 have a limited movement relative to each other for this purpose. A pin 99 is rigid in member 87 and a slot 100 is made in member 88 for the movement of the pin 99.

The fingers 69 and 70 are first spread by wedges 101 to receive the ends of the paper which has been wrapped around the candy, there being a wedge on each end of a shaft or bar 102, which is forced radially outward by a cam 103 carried on the frame piece 2. The bar 102 is operated by a yoke 105 which is operated by a rocker-shaft 106 which is journaled in the spoke members 14 and which carries an antifriction roller 104 which engages cam 103. A crank 107 is rigid with the shaft 106 and engages the inner end of the yoke 105 to force the same radially outward to carry the wedges 101. The roller 104 is carried in a crank arm 108 which is rigid with the rocker-shaft 106. The wedges are forced radially inward by a spiral spring 109 which is mounted on a guide rod 110 which is screwed into the bottom of the wrapping table 11 and moves freely through a lip or flange 111 projecting from the side of the yoke 105. The spring 109 bears against the bottom of the table 11 and against the lip or flange 111. The wedges 101 are forced to their outward limit by the face 112 of cam 103 and positive means are provided for forcing the wedges inwardly in the flange 113. The inner face of the flange 113 will engage the roller 104 and thus force the yoke 105 inwardly. This provision is necessary to force the wedges 101 out of the notches 114 of the fingers 69 and 70. The notches 114 prevent the wedges 101 from dropping down before the fingers 69 and 70 commence twisting the paper on the candy. The fingers 69 and 70 are provided with lugs 115 which lap past each other in operation to prevent the paper from working down between the fingers.

Means are provided for clamping the paper on the wrapping table 11 as it is received from the paper carrying wheel. Fingers 116 and 117 are provided for this purpose and these fingers are pivotally mounted in bearings 118 by a pivot bolt 120. These fingers are of different lengths because the paper is placed on the wrapping table at an angle to the vertical axis of the wheel 9. The fingers 116 and 117 are made to close at the same time the fingers 32 and 33 are opened and the fingers 116 and 117 are opened by a lug 121 on the sliding bar 41. A rocker shaft 122 is journaled in a bearing 123 which is integral with the bearing plate 76 and in a bearing 124 which is integral with table 11. The shaft 122 has a crank arm 125 integral therewith and terminating with a pin 126. The shaft 122 has another crank arm 127 integral therewith and this crank arm 127 has a lug 128 bearing a pin 129. As the wheel 9 carries a wrapping table 11 past the lug 121, this lug engages the pin 126 on the crank arm 125 of rocker-shaft 122 and shoves this pin radially outward and thus rocks the shaft 122 and thus simultaneously moves the crank arm 127 and causes the pin 129 to engage the paper holding finger 117 (which is rigid with shaft 120) and turn the finger on the shaft 120 and also turns the finger 116 which is rigid with the shaft 120. As soon as the fingers 116 and 117 pass the dead center relative to the shaft 120 and a point on the bracket 130, a spring 131, which is seated on the bracket 130 and bearing against a lug 132 rigid with the finger 117, causes the fingers 116 and 117 to snap on the sheet of paper lying on the table 11 and this is done as soon as the sheet of paper is deposited on the table 11. The fingers 57 coöperate with the fingers 116 and 117 by holding the paper on the opposite end of table 11 during a twisting operation. The table 11 has slots 133 for the passage of the fingers 32 and 33 just as they release the sheet of paper on the paper carrying table 19. The table 11 then carries the sheet of paper approximately 90 degrees to receive a stick of candy. Before the paper has been wrapped on a stick of candy by the wrapping mechanism, the fingers 116 and 117 are opened by a cam 133' rigid with the machine frame.

Means are provided for starting the paper on the candy. A starter 134, consists of a blade which tapers and which is curved in cross-section, as shown in Fig. 38. The blade 134 is attached to a head 135 which is mounted on a shaft 136 which is journaled eccentrically in a carrier 137, the carrier 137 consisting of a shaft and a head which has a cut away portion for head 135, as shown in dotted lines in Fig. 39 and in section in Fig. 41. The head 135 is held yieldingly in the cut-out in the carrier 137 by a spring 138, the head 135 having a peripheral cut-out for the spring 138 and the spring bearing loosely against the head and extending partly around the carrier 137 and the carrier having a peripheral cut-out at 139 in which the spring is attached to the carrier 137. This provision will give a yielding motion to the starter 134 to allow the starter to adapt itself to sticks of candy of different sizes. The carrier is journaled in a traveling block 140.

Means are provided for shifting the block 140 into and out of operative position. The block 140 is used to project the starter 134 into and out of operative positions at regular intervals, the starter being projected into a position just under the path of the paper and revolved one or more times, the revolving being accomplished by mechanism hereinafter described. The bearing flange 75 in table 11 has a cut-out 141 for the passage of the starter 134. Instantly after the starter 134 has wound the paper around the candy, it is withdrawn by the block 140. The block 140 reciprocates on pipes 142 and 143 which are mounted in the face of the gear wheel 15 and in the plate 144 which is bolted to a depending portion 145 of the casting of table 11. The block 140 is moved one way by a tape 146 which is attached to the block 140 at 148 on a projection 149 which moves in a slot in a pipe 150. The pipes 142, 143, and 150 pass through the block 140 and project into the plate 144. The tape 146 passes over idlers 151 which are journaled in flanges or ears 152 which are integral with plate 145 and project into the opening 153 in the casting 145. (See Figs. 30 and 32). The tape 146 then passes over idler 154 which is journaled in a bearing block 155 which is mounted in the gear wheel 15, the tape running through pipe 142. The tape is then attached to a slide 156 by means of a screw 157 which is provided with a roller 158. The roller 158 runs on the inner face of a cam 159 which is rigid on frame piece 1, and shown diagrammatically in Fig. 17. The slide 156 is moved radially by the cam 159 and the roller 158 prevents friction. In Fig. 3, the block 140 has been moved from its position against the wheel 15 to a position for holding the paper starter 134 in position to operate on the paper, the roller 158 having moved radially inward from the dotted outline shown in Fig. 3. The starter 134 can move slowly into operative position, but must be instantly removed from operative position after an operation. For this purpose a spring 160 operating in a pipe 160′ is used to move the starter to inoperative position. The spring 160 is attached to the spoke 14 of wheel 9 and to the tape 161. The tape 161 runs under an idler 162 which is journaled in a block 163 which is inserted in the wheel near the hub thereof and then over an idler 164 which is journaled in the bearing block 155. The tape 161 then runs through the pipe 143 and is attached to the block 140, pipe 143 having a slot 165 therein for the movement of the end of the tape at the point of attachment to the block 140.

The carrier 137 for the starter 134 is provided with a pinion 166 and this pinion is turned by a segmental rack 167 which is rigid with the frame 1, being carried by an arm 168. This is done at regular intervals every time a wrapping table 11 passes the paper starter 134. The starter 134 must be held in proper position to receive or engage the paper to start the same on the candy. A lock 169 is slidingly mounted in the block 140 and projects therefrom. The lock 169 is moved outwardly by a spring 170 which is seated in the block 140 and bears against the inner end of the lock 169. The lock 169 carries a pin 171 which projects into a recess in the face of the pinion 166 to lock the pinion against revolving. Since the pinion 166 is rigid with the carrier 137, the carrier and starter 134 will be held stationary. Thus the starter will be held in position to receive the paper. For the purpose of allowing the starter to turn the pinion 166 must be released. A cam 172 which is carried by the arm 168 projects into the path of the lock 169. As the wheel 9 is bringing the block 140 with the pinion 166 toward the rack 167, the cam 172 will force the lock 169 back into the block 140, carrying the pin 171 out of the pinion 166 so that the pinion will be engaged and turned by the rack 167. The pinion 166 will then drive the starter 134 to wrap the paper around the stick of candy. The pinion will turn or revolve the starter one or more revolutions and the cam 172 will leave the lock 169 and spring 170 will force the lock outwardly and carry the pin 171 into the pinion 166 and thus stop the pinion and consequently the starter in position to receive the paper for the next stick of candy. The block 140 is reciprocated between each starting and wrapping operation to get the starter out of the way of the operation of the twisting mechanism.

Means are provided for feeding the candy to the machine to be wrapped. A hopper 173 is provided to feed candy to individual trays 174 which are attached to sprocket chains 175. The chains 175 are driven by a driven sprocket wheel 176 and drive a sprocket wheel 177. The chains carry each tray along and pass under the hopper 173, one stick of candy dropping in each tray. As the trays pass over the sprocket wheel 177, they become inverted. A guard 178 is provided to hold the candy in the tray. The tray will roll the candy on the guard 178 until the guard terminates at a feeding drum 179 which has one or more recesses 180 to receive each a stick of candy. Positive means are provided for making the candy leave each tray. A scraper 181 is provided with fingers 182 which project slightly from the periphery of the drum 179 and pass over the candy and separate the same from the tray so that the candy will fall into one of the recesses 180. The trays 174 have cutouts 183 for the passage of the fingers 182. The scraper 181 is mounted by means of a bracket 184 which is attached to a brace 185 which is riveted to the scraper 181.

The candy feeding mechanism and the other mechanism are driven from a power shaft 186. A sprocket wheel 187 is rigid with shaft 186 and drives a sprocket chain 188 which drives a sprocket wheel 189 which is rigid with and drives a shaft 190. A spur gear 191 is rigid with the shaft 190 and drives a spur gear 192 which is rigid with the shaft 193 which drives the sprocket wheel 176 for feeding the candy to the feeding drum 179. The drum 179 is driven from the shaft 190 by means of a sprocket wheel 194 which drives a sprocket chain 195 which drives a sprocket wheel 196 of the drum 179. The spur gear wheel 15 of the candy wrapping wheel 9 is driven by a pinion 197 which is rigid with the power shaft 186. The wheels 9 and 16 are driven from the shaft 186. A pinion 197 meshes with and drives the spur gear wheel 15 which is rigid with and drives the shaft 5 which carries wheel 9. The gear wheel 15 meshes with and drives spur gear wheel 18 which is rigid with and drives shaft 8 which carries the paper feeding wheel 16.

The wrapping paper is fed from a reel 199 over an idle drum 200. The paper is cut into the desired lengths by a two bladed paper cutter 201 which is rigid with a gear wheel 202 which is driven by the gear wheel 18. The paper feeding wheel 16 is provided with rubber blocks 203 which are carried in arms 204 which are integral with the wheel 16. These rubber blocks are so timed that one of the blades 205 will bear against each rubber block. Each blade will cut a length of paper to be carried by a paper carrying table 19.

The sliding bar 41 is actuated by a ratchet wheel 206 which moves this bar toward the wrapping wheel 9 and the spring 56 snaps this bar in the opposite direction to engage pin 39 to close the fingers 32 and 33 on the table 19. The teeth of the ratchet wheel 206 engage successively a lug 207 on the bar 41 for moving this bar.

In Fig. 2 is shown attachments which may be used in coöperation with the rubber faced rollers and with the rollers 82 and may be used instead of the rollers 82. Rubber faced yielding bars 208 are pivotally mounted in a carrier 209 which may be mounted on the frame piece 2. Spiral springs 210 are placed behind the bars 208 in cavities 211 in the carrier, the cavities being extensive enough to receive the bars 208. These bars 208 press against the paper and candy while the paper is being wrapped on the candy and twisted.

Figs. 51 to 53 show a variation in the mechanism for twisting the paper about the ends of the sticks of candy. Fingers 212 are formed on the ends of shafts 213 and have slightly concaved faces adjacent to each other. Pinions 214 and 215 are mounted on the shafts 213, pinion 215 having a wider face or teeth than pinion 214 so that a pinion 216 can drive pinion 215 without engaging pinion 214. The pinions 214 and 215 mesh with each other so that pinion 215 will drive pinion 214. The shafts 213 are journaled in the rim of a revolving sleeve 217, this sleeve having a cut-out for the pinions 214 and 215. The pinion 216 is mounted on a reduced portion 218 of carrier 217 and has a curved lip 219 which projects past the periphery of the pinion 215. An internal segmental gear is formed on the lip 219 for engaging the pinion 215 for driving this pinion periodically when the paper is to be twisted on the candy. The pinion 216 is driven by the pinion 80 heretofore described when the above described variation may be used. The pinion 216 has a limited peripheral movement relative to the carrier 218. A pin 220 projects from the face of the pinion 216 into a slot 221 in the face of the carrier 218. The object of the limited motion of the pinion 216 relative to the carrier 218 and of the segmental gear 219 is to close the fingers 212 on the paper to commence twisting the paper. This is done before the carrier 218 commences to revolve. When the carrier 218 commences to revolve, a cam 222 on the frame 2 bears the carrier 218 slightly toward the end of the stick of candy so that the twisting will extend up to the end of candy. After the carrier 218 passes the cam 222, a spring 223 restores the carrier to its normal position. After the twisting operation on a stick of candy is completed, spiral springs 224 on the shafts 213 restore the fingers 212 to open position. Unless the carrier is forced toward the end of the candy, the paper might be torn as the paper becomes shorter as it is being twisted.

The variations shown in Figs. 54 to 57 inclusive are intended to substitute for the paper starting mechanism and the rollers 82 hereinbefore described. Two quadrangular frames 225 and 226 are provided to be made rigid with the machine frame and made rigid with each other by cross bars 226' and 227. A series of paper starting fingers 228 are pivotally mounted on a crank-shaft 229 which is journaled in vertically yielding bearings 230. The bearing members 230 telescope into tubular members 231 which are rigid with a cross-bar 232 and this bar is rigid with cross-bars 233 in which is journaled a shaft 234. The bars 233 are made rigid with the members 231 by braces 235 and collars 236. The crank-shaft 229 and the bar 232 with the paper packing fingers 228 are movable in the quadrangular frame 225 and are made to move thereon by a pitman rod 237 which is pivotally connected to the shaft 234 and is operated by a crank 238 which is rigid with the shaft 239 which is driven by a pinion 240 and this pinion is driven by the driving wheel 15. The bars 241 of the quadrangular frame 225 have channels 242. Rubber faced rollers 243 are mounted on the shaft 234 and on journals 244 formed on the bar 232 so that the bar 232 and shaft 229 with bearing members 230 and 231 and fingers 228 are all movable together. The shaft 229 is also provided with rubber faced rollers 245 which run on top of the quadrangular frame 225. The moving of the bar 232 and the bearing members will move the fingers 228 and the rollers 245 will be revolved by friction against the frame 225 and thus turn the crank-shaft 229 for moving the fingers 228 vertically for packing the paper or starting the paper around the candy sticks. The bearing members 225 and 231 are held yieldingly in their operative positions by springs 246. The fingers 228 move vertically through the bar 232 which is provided with slots 247 for this purpose. The object in showing some of the fingers 228 going up while the others go down is to prevent the paper from rising up from the candy. Rubber faced spring fingers 248 are attached to a bar 249 and this bar is attached to the bars 241 to bear the candy sticks down against the rollers 74 to make the paper wrap snugly on the candy sticks.

While the invention has herein been described for wrapping sticks of candy and is especially adapted for this purpose, it is to be understood that it is not restricted to this particular use, but may be employed with advantage for wrapping paper or like flexible material about other elongate or substantially cylindrical bodies, and while the means herein described constitute one good practical form of the invention, it is to be understood that the particulars of the means described may be varied within the true scope of the invention as defined by the claims.

Applicant appears to be the first in this art to deliver to a carrying member the wrapping paper with the grain running in one direction and then to change or shift the paper relative to the carrying member or articles to be wrapped that the grain of the paper may extend longitudinally of the article to thereby secure greater strength and permanency of the wrapping material. It is also broadly new to provide starters for starting the paper about the article by moving the starters longitudinally into operative position from the side of the member carrying the wrapping devices and then in a direction about the article to be wrapped, to start the paper or wrapper that the wrapping devices may complete the wrapping operation and result in a neat and properly-wrapped package. Other features of the invention will also appear herein and be definitely described by the claims.

What I claim, is,—

1. A candy wrapping machine comprising two revolving members, one revolving member carrying a series of rotatable paper carrying tables and the other revolving member carrying a series of wrapping tables, means for rotating each paper carrying table one-quarter turn during the travel thereof to turn each sheet of paper at right angles to the travel thereof, means for shifting sheets of paper from the paper carrying member to the wrapping member and means for feeding sticks of candy to the tables carried by the wrapping member.

2. A candy wrapping machine comprising a revolving wrapping member and a revolving paper feeding member, the latter carrying a series of rotatable tables, each carrying a single sheet of paper, means for turning each rotatable table one-quarter turn to place the grain of each sheet of paper at right angles to the travel of said feeder member, the wrapping member having a series of wrapping tables, means carried by the two revolving members for shifting a sheet of paper from one paper carrying table to one wrapping table on the other member and means for wrapping the sheet of paper about a stick of candy.

3. A candy wrapping machine comprising a paper carrying and feeding revolving member, a revolving member carrying a series of wrapping tables, means on the paper carrying member for turning each sheet of paper at right angles to the travel of the revolving member, means for shifting the sheet of paper from the paper carrying member to each one of the tables on the revolving wrapping member and means for wrapping a sheet of paper about a stick of candy on a wrapping table of the wrapper revolving member.

4. A candy wrapping machine comprising a paper carrying member provided with a series of rotatable tables thereon, each carrying a sheet of paper, a wrapper revolving member carrying a series of wrapping tables, means for shifting a sheet of paper from the paper carrying table to a wrapping table as these tables pass each other, means carried on a wrapping table for clamping the sheet of paper to the wrapping table, means for feeding candy stick by stick to a wrapping table and means carried by the wrapper member for twisting the paper on each stick of candy.

5. A candy wrapping machine having a revolving paper feeding member, a revolving candy wrapping member, the paper feeding member being provided with means for cutting the paper into sheets and having a series of rotatable paper carrying tables for turning each sheet of paper at right angles to the travel of said wheel, the wrapper member having a series of wrapping tables, means for shifting a sheet of paper from a paper carrying table to a wrapping table as these tables pass each other and means carried by the wrapping member for wrapping each sheet of paper about a stick of candy and twisting the ends of the paper at the ends of the stick of candy.

6. A candy wrapping machine having a revolving paper feeding member, a revolving wrapping member, means for feeding paper to the paper carrying member, a series of rotatable tables carried by the feeder member, means for feeding paper to said tables, means coöperating with said feeder member for cutting the paper into sheets and leaving a sheet of paper on each paper carrying table, means for turning each rotatable member one-quarter turn for turning each sheet of paper at right angles to the travel of said feeder member, a series of wrapping tables carried by the revolving wrapper member, means for shifting the paper sheet by sheet from the paper carrying member to the wrapping tables of the wrapping member and means carried by the wrapper member for wrapping a sheet of paper about a stick of candy.

7. A candy wrapping machine comprising a revolving feeder member, a revolving wrapping member, a series of rotatable tables carried by the feeder member, means for cutting the paper into sheets, one sheet for each table, means for clamping the paper on each table, means for rotating each table to turn the same at right angles to the travel of the feeding member, the wrapper member having a series of wrapping tables, means for shifting a sheet of paper from one of said rotatable tables to one of said wrapping tables as these tables pass each other, and means carried by each wrapping table for wrapping the sheet of paper about a stick of candy on said wrapping table.

8. A candy wrapping machine comprising a revolving paper carrying member, a revolving wrapper member, a series of rotatable tables carried by the feeder member, means for feeding paper to said feeder member, means for cutting a sheet of paper for each rotatable table, means for clamping the sheet of paper on the rotatable table, a series of wrapping tables carried by the wrapper member, means for shifting a sheet of paper from each rotatable table to a wrapping table as these tables pass each other, means for clamping a sheet of paper on the wrapping table and means carried by each wrapping table for wrapping and twisting a sheet of paper about a stick of candy.

9. A candy wrapping machine having a revolving feeder member, a revolving wrapper member, a series of rotatable tables carried by the feeder member, means for feeding paper to said feeder member, means coöperating with said feeder member for cutting the paper into sheets, one sheet for each table, pivoted fingers for holding each sheet of paper on each table, means for rotating each table at right angles to the feeder member, a series of wrapping tables carried by the wrapper member, tripping devices for releasing the paper on the rotatable table, means for simultaneously shifting a sheet of paper from a paper carrying table to a wrapping table and means for simultaneously clamping the sheet of paper on the wrapping table and means carried by each wrapping table for wrapping the sheet of paper on a stick of candy.

10. A candy wrapping machine comprising a revolving feeder member, a revolving wrapper member, a series of rotatable tables carried by the feeder member, means for feeding paper to the feeder member, means coöperating with the feeder member for cutting the paper into sheets, means carried by each table for clamping the sheet of paper on the rotatable table, tripping devices for turning each rotatable table at right angles to the travel of the feeder member, a series of wrapping tables carried by the wrapper member, means for releasing a sheet of paper on a rotatable table, means for shifting each sheet of paper to one of said wrapping tables, means for rotating each rotating table one-fourth turn after delivering a sheet of paper and means carried by each wrapping table for wrapping the sheet of paper about a stick of candy.

11. A candy wrapping machine comprising a revolving feeder member, a revolving wrapper member, a series of rotatable tables carried by the feeder member, means for feeding paper to the feeder member, means for cutting a sheet of paper for each table, means for clamping the sheet of paper on each table, lugs carried on opposite sides of each rotatable table, a series of wrapping tables carried by said wrapper member, tripping devices for engaging said lugs for turning each rotatable table at right angles to the travel before a rotatable table passes a wrapping table, means for shifting a sheet of paper from a rotatable table to a wrapping table as these tables pass each other, a tripping device for turning said rotatable table back to its normal position after passing a feeding table and means carried by each wrapping table for wrapping a sheet of paper about a stick of candy.

12. A candy wrapping machine comprising a revolving feeder member, a revolving wrapper member, a series of rotatable tables carried by the feeder member, means for feeding paper to said tables, means for cutting a sheet of paper for each table, pivoted fingers on each table for clamping a sheet of paper thereon, a shiftable rack carried by each table for actuating said fingers, means for turning each table at right angles to the travel of the feeder member, a series of wrapping tables carried by the wrapper member, means for shifting a sheet of paper from a rotatable table to a wrapping table as these tables pass each other, means for turning the wrapping table back to its normal position after passing a wrapping table and means carried by each wrapping table for wrapping a sheet of paper about a stick of candy.

13. A candy wrapping machine comprising a revolving feeder member, means for feeding paper thereto, a series of rotatable tables carried by the feeder member, means for cutting a sheet of paper for each table, means for turning each rotatable table one-quarter turn for turning each sheet of paper at right angles to the travel of said feeder member, a means for shifting each sheet of paper from each table, a wrapper member, a means carried on the wrapper member for receiving the paper from each of said tables and wrapping each sheet about a stick of candy.

14. A candy wrapping machine comprising a revolving feeder member, a series of rotatable tables carried by the feeder member, means for feeding paper thereto, means for cutting the paper into sheets, a sheet for each table, clamping means for clamping paper on each table, a wrapper member, a series of wrapping tables on said wrapper member, means for shifting a sheet of paper from each rotatable table to a wrapping table as the rotatable table passes the wrapping table, means for turning each rotatable table for turning the sheet of paper thereon at substantially right angles to the travel of said feeder member prior to shifting the paper, and means on each wrapping table for wrapping the paper about a stick of candy.

15. A candy wrapping machine comprising a wrapper member provided with mechanism for wrapping a sheet of paper about a stick of candy successively, a feeding member comprising a revolving member having a series of hollow spokes, a series of wrapping tables having spindles projecting down into said spokes, means for retaining said spindles in said spokes, a tripping device projecting through each spoke, means for feeding paper to said revolving member, means for coöperating with said revolving paper for cutting the paper into sheets, a sheet for each table, means for clamping the paper on each table, means adapted to engage said tripping device for turning each table at right angles to the travel of said revolving member prior to the delivery of a sheet of paper, means for shifting a sheet of paper from each table as the table passes said wrapper member and means for turning the wrapping table back to normal position after passing a wrapper member.

16. A candy wrapping machine comprising a wrapping member, a series of wrapping tables on said wrapper member, a paper feeding member comprising a revolving wheel, a series of rotatable tables carried on said wheel for feeding paper sheet by sheet to one of said wrapping tables as the rotatable table passes a wrapping table, each rotatable table having fingers pivotally connected therewith for clamping a sheet of paper thereon, a shiftable rack for actuating said fingers, a lever operatively connected with said rack and having projecting lugs, means coöperating with said revolving wheel for actuating said lever to clamp the fingers on the paper prior to the delivery of a sheet of paper from said table and means coöperating with said wheel for actuating said lever to open said fingers at the time of delivery of a sheet of paper to the wrapping member.

17. A candy wrapping machine comprising a revolving member, a series of wrapping tables carried by said revolving member, a wrapping table having fingers pivotally connected thereto for clamping a sheet of paper thereon, a candy feeding member for feeding the candy stick by stick to a wrapping table as the table passes the feed member, means carried by each table for starting a sheet of paper around a stick of candy, means for pressing the paper against the candy as the paper is being wound on the candy, means for revolving the candy on the table while the paper is being applied thereto and means for releasing said fingers and discharging the candy therefrom.

18. A candy wrapping machine comprising a revolving member, a candy feeding member adapted to feed candy stick by stick to said revolving member, a plurality of wrapping tables carried by said revolving member and passing said candy feed member, means for feeding paper to each wrapping table prior to the passing of said candy feeding member, means for clamping the paper on a wrapping table, means for starting the paper around each stick of candy, means for revolving the candy for wrapping the sheet of paper thereon, and means for twisting the paper at the ends of the stick of candy.

19. A candy wrapping machine comprising a revolving member, a series of wrapping tables carried thereby, means for feeding a sheet of paper to each wrapping table, a candy feeding member adapted to feed a stick of candy to each wrapping table as the table passes the feeding member, means for clamping and releasing the paper on the wrapping table, pressing members for pressing the paper on the candy as the paper is being wrapped about the stick of candy, means for twisting the paper at each end of the stick of candy after the paper is wrapped about the candy and means for automatically releasing said pressing members from the paper and the candy.

20. A candy wrapping machine comprising a revolving member, a series of wrapping tables carried by said member, means for feeding a sheet of paper to each table, a candy feeding member for feeding candy a stick at a time to each table as the table passes the candy feeding member, a paper starting mechanism for starting the sheet of paper around the stick of candy including a paper moving member and actuating devices operatively connected therewith and with said frame for operating the moving member, means carried by each table for wrapping the paper on the candy and means carried by each table for twisting the paper at the end of the stick of candy.

21. A candy wrapping machine comprising a frame, a revolving member journaled in said frame, a series of wrapping tables carried on the periphery of said revolving member, means for feeding a sheet of paper to each table, a candy feeding member for feeding the stick of candy to each table as the table passes the candy feeding member, a paper starter, means carried by said revolving member for actuating said paper starter, means on said frame coöperating with said actuating mechanism, means on each table for wrapping the paper on the stick of candy, and means for discharging the candy from each table.

22. A candy wrapping machine comprising a frame, a revolving member journaled in said frame, a series of wrapping tables carried on the periphery of said revolving member, means for feeding paper to each table, means for feeding a stick of candy to each table, a paper starter, actuating mechanism carried by said revolving member and said frame for actuating said paper starter, means carried by each table for wrapping the paper on the candy and means on the frame for actuating said paper wrapping means.

23. A candy wrapping machine comprising a frame, a revolving member journaled in said frame, a series of wrapping tables carried on the periphery of said revolving member, means for feeding a sheet of paper to each table, means for feeding a stick of candy on the paper on each table, a paper starter, means carried by said revolving member and said frame for thrusting said paper starter into the path of the candy for starting the paper thereon and for withdrawing the starter from the path of the candy after starting the candy thereon, and means carried by each table for wrapping the sheet of paper on the stick of candy.

24. A candy wrapping machine comprising a frame, a revolving member journaled in said frame, a series of tables mounted on the periphery of said frame, means for feeding a sheet of paper to each table, means for feeding a stick of candy on each sheet of paper, a paper starter, means carried by said frame and said revolving member for thrusting said paper starter into the path of the candy for starting the sheet of paper around the candy and for withdrawing the starter from the path of the candy, means carried by said frame and said revolving member for revolving said paper starter while in an engagement with the sheet of paper, and means on each table for wrapping the sheet of paper about the candy.

25. A candy wrapping machine comprising a frame, a revolving member journaled in said frame, a series of wrapping tables carried on the periphery of said revolving member, means for feeding a sheet of paper to each table, means for feeding a stick of candy on each sheet of paper, means carried by each table for holding the candy in place to be wrapped, a paper starter, an actuating mechanism carried by said frame, a revolving member for thrusting said starter into the path of the wrapping table for starting the paper on the stick of candy and for instantly withdrawing the starter after each operation, means for revolving the starter while in engagement with the sheet of paper, a paper holding means carried by each table for holding and bearing the sheet of paper down on the candy, and a twisting mechanism for twisting the paper at the ends of the stick of candy.

26. A candy wrapping machine comprising a frame, a revolving member journaled in said frame, a series of wrapping tables carried on the periphery of said frame, means for feeding a sheet of paper to each table, means for feeding a stick of candy to each sheet of paper on the table, a paper starter mechanism carried by each table, a coöperating mechanism carried by the frame for thrusting the paper starter into the path of a wrapping table prior to the starting of the sheet of paper on the stick of candy and for withdrawing the starter after the paper has been started on the stick of candy, means carried by the table in combination with means carried by said frame for revolving the starter while in engagement with the paper, and means carried by the table for wrapping the paper on the candy.

27. A candy wrapping machine comprising a frame, a revolving member journaled in said frame, a series of tables carried on the periphery of said revolving member, means for feeding a sheet of paper to each table, means for feeding a stick of candy on the paper on each table, a clamping means for clamping the paper to the table prior to a wrapping mechanism, means carried by the frame and the revolving member for actuating said clamping means, means carried by each table for wrapping the paper on the stick of candy, a paper twisting mechanism for each table and means carried on the frame on the said revolving member for actuating said paper twisting means.

28. A candy wrapping machine comprising a frame, a revolving member journaled in said frame, a series of wrapping tables carried on the periphery of said revolving member, means for feeding a sheet of paper to each table, means for feeding a stick of candy to each table on the sheet of paper, a paper clamping mechanism, means carried on the frame and the revolving member for actuating the paper clamping mechanism, means for holding the paper at each end of the stick of candy, means for revolving the candy while the paper is held at each end and means for starting the paper on the candy prior to the revolving of the candy.

29. A candy wrapping machine comprising a frame, a revolving member journaled in said frame, a series of wrapping tables carried on the periphery of said revolving member, means for feeding a sheet of paper to each table, means for feeding a stick of candy to each table on the sheet of paper, a paper clamping mechanism including a yoke and rollers carried therein, means carried on said revolving member and stationed on said frame for actuating said paper clamping mechanism, means for starting the paper on the candy, movable fingers for holding the sheet of paper at the ends of the candy, means carried on said revolving member and the said frame for actuating said fingers and means for revolving the candy while said fingers are holding the sheet of paper at each end.

30. A candy wrapping machine comprising a frame, a revolving member journaled in said frame, a series of wrapping tables carried on said revolving member, means for feeding a sheet of paper to each table, means for feeding a stick of candy to each table on the paper, a paper clamping mechanism carried by each table, means for starting the paper on the candy, movable fingers for holding the paper at each end of the stick of candy, means for revolving the stick of candy while said fingers are holding the paper at the ends of the stick of candy and means coöperating with said fingers for holding the paper in place in said fingers.

31. A candy wrapping machine comprising a frame, a revolving member journaled in said frame, a series of wrapping tables carried on the periphery of said revolving member, means for feeding the sheet of paper to each table, means for feeding a stick of candy to each table on the sheet of paper, a paper starter for starting the sheet of paper around each stick of candy, actuating mechanism carried by said revolving member and said frame for thrusting said paper starter into the path of the candy prior to the starting of the paper about the candy and for withdrawing the paper starter after each operation, means for holding the paper in position to be thrust into the path of the candy and means carried by the revolving member and the frame for revolving the candy during the wrapping operation.

32. A candy wrapping machine comprising a frame, a revolving member journaled in said frame, a series of wrapping tables carried on the periphery of said revolving member, means for feeding a sheet of paper to each table, means for feeding a stick of candy to each table on the sheet of paper thereon, means for clamping the paper on each table, means carried by said frame and said revolving member for actuating said clamping mechanism to clamp and release the paper, and means carried by the table for wrapping the sheet of paper on the stick of candy.

33. In a wrapping machine, the combination of two revolving members, one carrying a series of paper supporting tables and the other a series of wrapping devices, means for supplying paper to the paper supporting tables for delivery to the wrapping devices, and means for turning the paper carrying tables relatively to the revolving member upon which they are mounted before delivery of the paper to the wrapping devices.

34. In a wrapping machine, the combination of two relatively movable members, one provided with a series of paper supporting devices and the other with a series of wrapping devices, means for supplying paper to the paper supporting devices, means for bodily shifting the paper relatively to the member carrying the supporting devices from the position in which it is received by the paper supporting devices to a position at an angle to such receiving position, and means for transferring the paper from the paper supporting devices to the wrapping devices after the paper has been thus bodily shifted.

35. In a wrapping machine, the combination of two relatively movable members, one provided with a series of paper supporting devices and the other with a series of wrapping devices, means for supplying paper to the paper supporting devices with the grain of the paper running in one direction, means for turning the paper relative to the member carrying the paper supporting devices to change the direction of the grain of the paper, and means for thereafter transferring the paper from the paper carrying devices to the wrapping devices.

36. In a wrapping machine, the combination of a member having a series of paper supporting devices mounted thereon, means for supplying paper to the supporting devices with the grain running in one direction, means for moving said member, means for shifting the paper relative to said member to change the direction of the grain of the paper relative to said member, a second movable member having a series of wrapping devices, and means for transferring the paper from the paper supporting devices to the wrapping devices of the second member after the grain of the paper has been shifted.

37. In a wrapping machine, the combination of a paper carrying member, a wrapping member, means for supplying paper to the paper carrying member with the grain of the paper running in one direction, means for shifting the position of the paper on the paper carrying member after it has been supplied thereto to change the direction of the grain of the paper relative to said member, and means for transferring the paper from the paper carrying member to the wrapping member after the position of the paper has been shifted.

38. In a wrapping machine, the combination of a revolving paper supporting member provided with a series of paper supporting devices, a revolving wrapping member provided with a series of wrapping devices, means for delivering paper to the paper supporting devices with the grain of the paper running in one direction, means for moving the paper supporting devices relatively to the revolving paper supporting member to change the direction of the grain of the paper, and means for transferring the paper from the paper supporting devices to the wrapping devices.

39. In a wrapping machine, the combination of a wrapping member carrying a series of wrapping devices, paper supplying means for delivering paper with the grain running in one direction, means for supplying the articles to be wrapped to the wrapping member, and means for changing the direction of the grain of the paper as delivered by the supplying means before the paper is wrapped about the articles delivered to the wrapping devices.

40. In a wrapping machine, the combination of paper supplying means, a revolving paper carrying member provided with a series of paper supporting devices to receive paper from the supplying means with the grain running in one direction, means for turning the paper supporting devices relatively to the revolving paper carrying member on which they are mounted to change the direction of the grain of the paper, and a revolving wrapping member having a series of wrapping devices for receiving the paper from the paper supporting members.

41. In a wrapping machine, the combination of a paper carrying member provided with a series of paper supporting devices, a paper wrapping member having a series of wrapping devices, means for delivering articles to the wrapping member to be wrapped, paper supplying means for supplying paper with the grain of the paper running in one direction relative to the articles to be wrapped, and means for changing the direction of the grain of the paper relative to said articles before the articles are wrapped.

42. In a wrapping machine, the combination of a member provided with a series of wrapping devices, means for delivering paper to the wrapping devices, means for supplying the articles to be wrapped, a wrapping starter, means for moving the starter longitudinally of the article to be wrapped to engage the paper to be wrapped about the article, and means for moving the starter about the article to start the paper about the article.

43. In a wrapping machine, the combination of a wrapping member carrying a series of wrapping devices, means for supplying the wrappers and articles to be wrapped, a starter for starting the wrapper about the article, means for moving the starter longitudinally of the article to be wrapped and in a direction about the article to start the wrapper and to then withdraw the starter.

44. In a wrapping machine, a member carrying a series of wrapping devices, means for supplying paper and articles to be wrapped, a paper starter, means for moving the paper starter into paper starting position, means for moving the starter in a direction at an angle thereto to start the paper about the article, and means for actuating the wrapping devices.

45. In a wrapping machine, a member carrying a series of wrapping devices, means for supplying paper and articles to be wrapped, a paper starter comprising a finger, means for moving the finger longitudinally in position to engage and start the paper about the article to be wrapped and to then withdraw said finger, and means for actuating the wrapping devices to complete the wrapping operation.

46. In a wrapping machine, the combination of a member carrying a series of wrapping devices, means for supplying paper and articles to be wrapped, a starter for starting the paper about an article to be wrapped, means for longitudinally moving the starter into and out of starting position and in a direction about the article to be wrapped, and means for actuating the wrapping devices.

47. In a wrapping machine, the combination of a member carrying a series of wrapping devices, means for supplying paper and articles to be wrapped, a starter for starting the paper about an article to be wrapped, means for longitudinally moving the starter into and out of starting position and in a direction about the article to be wrapped, means for actuating the wrapping devices, and end twisting means for twisting the ends of the paper at each end of the wrapped article.

48. In a machine for wrapping articles of substantially cylindrical form, the combination of a revolving member provided with a series of wrapping rollers, means for delivering paper and articles to be wrapped, a starter, means for moving the starter in a direction longitudinally of the wrapping rollers to operatively position and withdraw the starter, and means for moving the starter in a direction about the article to be wrapped when the starter is in operative position, and means for turning the rollers to complete the wrapping operation.

49. In a wrapping machine for wrapping articles of substantially cylindrical form, the combination of a member carrying a series of wrapping devices, a starter, means for inserting and withdrawing the starter to and from operative position from the side of the said member, means for moving the starter in a direction about the article to be wrapped when in operative position, and means for pressing the paper against the article as the paper is being wrapped about it.

50. In a wrapping machine for wrapping articles of substantially cylindrical form, the combination of a revolving member carrying a series of wrapping devices for revolving the articles to be wrapped, means for supplying paper and articles to be wrapped, end twisters, means for moving said end twisters radially of the revolving member to engage the paper beyond the ends of the article to cause the ends of the paper to be twisted as the article is revolved.

51. In a wrapping machine for wrapping articles of substantially cylindrical form, the combination of a revolving member carrying a series of wrapping devices for revolving the articles to be wrapped, means for supplying paper and articles to be wrapped, a starter, means for moving it from the side of the revolving member to operative position and then about the article to be wrapped to start the wrapping operation, end twisters, means for moving said end twisters radially of the revolving member to engage the paper beyond the ends of the article to cause the ends of the paper to be twisted as the article is revolved.

In testimony whereof, I set my hand in the presence of two witnesses, this 20th day of March, 1915.

JESSE W. GREER.

Witnesses:
A. L. JACKSON,
J. W. STETT.

Copies of this patent may be obtained for five cents each, by addressing the "Commissioner of Patents, Washington, D. C."